United States Patent
Simard et al.

(10) Patent No.: US 7,286,699 B2
(45) Date of Patent: *Oct. 23, 2007

(54) SYSTEM AND METHOD FACILITATING PATTERN RECOGNITION

(75) Inventors: Patrice Y. Simard, Sammamish, WA (US); Jonathan Platt, Bellevue, WA (US); David Willard Steinkraus, Santa Fe, NM (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/327,913

(22) Filed: Jan. 9, 2006

(65) Prior Publication Data

US 2006/0110040 A1 May 25, 2006

Related U.S. Application Data

(63) Continuation of application No. 10/099,388, filed on Mar. 15, 2002, now Pat. No. 7,016,529.

(51) Int. Cl.
*G06K 9/00* (2006.01)
*G06K 9/62* (2006.01)

(52) U.S. Cl. ............... 382/155; 382/156; 382/157; 382/161; 382/181; 382/187; 382/224

(58) Field of Classification Search ........ 382/155–157, 382/159–160, 181–182, 185–187, 190, 224
See application file for complete search history.

(56) References Cited

U.S. PATENT DOCUMENTS 5,465,321 A * 11/1995 Smyth ..................... 706/20
5,572,628 A 11/1996 Denker et al.
5,625,708 A 4/1997 LeCun
5,647,022 A 7/1997 LeCun et al.
5,835,633 A * 11/1998 Fujisaki et al. ............ 382/187
6,028,956 A * 2/2000 Shustorovich et al. ...... 382/156
6,038,337 A 3/2000 Lawrence et al.
6,128,606 A 10/2000 Bengio et al.
6,324,532 B1 * 11/2001 Spence et al. .............. 706/27

OTHER PUBLICATIONS

Sang-Hoon Oh, Generalizaqtion of the Cross-Entropy Error Function to Improve the Error Backpropagation Algorithm, Aug. 1997, IEEE, 1856-1861.*
S. Jaeger, et al. "NPEN++: An On-Line Handwriting Recognition System", Proceedings of the Seventh International Workshop on Frontiers in Handwriting Recognition, Sep. 11-13, 2000, p. 249-260.
Y. LeCun, et al. "Gradient-Based Learning Applied to Document Recognition", Proceedings of the IEEE, Nov. 1998, p. 1-46.

(Continued)

*Primary Examiner*—Bhavesh M Mehta
*Assistant Examiner*—John B Strege
(74) *Attorney, Agent, or Firm*—Amin, Turocy & Calvin, LLP

(57) ABSTRACT

A system and method facilitating pattern recognition is provided. The invention includes a pattern recognition system having a convolutional neural network employing feature extraction layer(s) and classifier layer(s). The feature extraction layer(s) comprises convolutional layers and the classifier layer(s) comprises fully connected layers. The pattern recognition system can be trained utilizing a calculated cross entropy error. The calculated cross entropy error is utilized to update trainable parameters of the pattern recognition system.

20 Claims, 10 Drawing Sheets

OTHER PUBLICATIONS

S. Lawrence, et al. "Face Recognition: A Convolutional Neural Network Approach", IEEE Transactions on Neural Networks, vol. 8, No. 1, 1997, p. 98-113.

Loo-Nin Teow, et al. "Handwritten Digit Recognition with a Novel Vision Model that Extracts Linearly Separable Features". Proceedings of the IEEE Conference on Computer Vision and Pattern Recognition, vol. 2, 2000, p. 76-81.

Y. LeCun, et al. "Learning Algorithms for Classification: A Comparison on Handwritten Digit Recognition", 1995 p. 1-16.

T. Hastie, et al. "Metrics and Models for Handwritten Character Recognition", AT&T Research Laboratories, Dec. 1997, p. 1-18.

P. Simard, et al. "Transformation Invariance in Pattern Recognition-Tangent Distance and Tangent Propagation", 1998 p. 1-35.

* cited by examiner

SYSTEM AND METHOD FACILITATING PATTERN RECOGNITION

CROSS-REFERENCE TO RELATED APPLICATIONS

This application is a continuation of U.S. patent application Ser. No. 10/099,388 entitled "SYSTEM AND METHOD FACILITATING PATTERN RECOGNITION", filed Mar. 15, 2002 now U.S. Pat. No. 7,016,529, the entirety of which is hereby incorporated by reference.

TECHNICAL FIELD

The present invention relates generally to pattern recognition, and more particularly to a system and method employing a convolutional neural network facilitating pattern recognition.

BACKGROUND OF THE INVENTION

Pattern recognition can be based, for example, on keystrokes captured from a pen/tablet input device or scanned documents. Many conventional pattern recognition systems require knowledge of the target language. In many instances parameters of pattern recognition systems employing neural network are hand-tuned for a particular target language (e.g., English and/or Japanese). As such, these pattern recognition systems are not readily adaptable to use with language(s) other than those for which the system were hand-tuned. Other conventional pattern recognition systems require temporal knowledge of input keystroke(s) and, thus, can be computationally complex.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a pattern recognition system that can be utilized to perform hand written pattern recognition and/or character recognition from scanned documents. The pattern recognition system is based on a convolutional neural network (CNN) architecture, for example, comprising feature extraction layer(s) and classifier layer(s) trained utilizing cross entropy minimization.

In accordance with an aspect of the present invention, the pattern recognition system receives a bitmap input pattern (e.g., two-dimensional) and provides a plurality of probability outputs. The pattern recognition system learns from input training data without the need for language specific knowledge, temporal stroke input, pen-directional information and/or stroke order. The pattern recognition system provides output probabilities for the bitmap image patterns (classes) evaluated. The output probabilities can be utilized, for example, by language classifier(s), language model(s) and/or segmentation model(s).

The pattern recognition system can be trained utilizing cross entropy error minimization. For example, the pattern recognition system can be trained using stochastic gradient descent minimizing cross entropy error.

The feature extraction layer(s) comprises convolutional layer(s) of feature maps in which a feature map use substantially the same set of coefficients or weights to modify the inputs received; however various feature maps use different sets of coefficients. Accordingly, feature maps can extract different feature(s) from the inputs received. The outputs of the feature extraction layer(s) are connected to the classifier layer(s).

The classifier layer(s) comprises fully connected layer(s) of hidden units. The quantity of hidden units can depend, for example, on the complexity of the task to be learned, the quantity and/or quality of training examples. The last classifier layer provides the output probabilities.

Another aspect of the present invention provides for a pattern recognition system having convolutional layer(s) and fully connected layer(s). The pattern recognition system receives a bitmap input pattern (e.g., two-dimensional) and provides a plurality of output probabilities. The pattern recognition system can be trained utilizing cross entropy error minimization (e.g., using stochastic gradient descent minimizing cross entropy error).

The convolutional layer(s) includes a plurality of feature maps in which a feature map uses the same set of trainable parameters (e.g., coefficients or weights) to modify the inputs received; however various feature maps use different sets of trainable parameters (e.g., coefficients or weights). The feature map receives at least a portion of the input pattern. Accordingly, the feature maps can extract different feature(s) from the inputs received. The outputs of the convolutional layer(s) are connected to the fully connected layer(s).

The fully connected layer(s) receives outputs from the convolutional layer(s) and classifies the features extracted by the convolutional layer(s). The fully connected layer(s) provides a plurality of output probabilities, the output probability comprising a probability associated with a class. The fully connected layer(s) includes a plurality of hidden units. The fully connected layer(s) can have its own set of trainable parameters.

The pattern recognition system can be trained utilizing cross entropy error minimization being based, at least in part, upon the following equation:

$$E = -\sum_n \sum_{k=1}^{c} \{t_k^n \ln(y_k^n) + (1 - t_k^n)\ln(1 - y_k^n)\}$$

Where E is the energy to be minimized, n indexes patterns, t is the target value, $y_k^n$ is the pattern recognition system output on unit k for pattern n, and k indexes the classes (e.g., for handwritten digits, with 10 classes, c=10). This error equation is sometimes referred to in the art as Kullback-Leibler divergence (or KL distance). In one example, this cross entropy error (E) is multiplied by a first constant. In another example, a second constant is added to E. Further, the pattern recognition system can be trained using stochastic gradient descent.

The pattern recognition system can be trained to recognize a character alphabet or an alphabet subset. For example, if the input originates from a tablet, the pattern recognition system can be utilized for substantially all characters that are generated with one or two strokes of a pen. In the case of Chinese or Japanese characters, this corresponds to a subset of less than 500 classes of the total alphabet.

Yet another aspect of the present invention provides for a pattern recognition system having a first convolutional layer, a second convolutional layer, a first fully connected layer and a second fully connected layer. Optionally, the pattern recognition system can include a preprocessing component.

The first convolutional layer and the second convolutional layer extract features of the bitmap image input pattern (e.g., two-dimensional). The first fully connected layer and the second fully connected layer work as a classifier.

The first convolutional layer comprises a plurality of first feature maps that receive at least a portion of the input pattern. The first feature map includes first trainable parameters and provides outputs associated with first features. The first feature maps comprise small kernels (e.g., 5 by 5) of trainable parameters (e.g., coefficient or weights) that multiply and sum the inputs and obtain results for various positions. In effect, the convolution can be seen as a trainable filter that extracts a "feature" image from its input image. The first trainable parameters for a first feature map can be equal for different spatial locations in the input image (e.g., when translated from position to position).

The second convolutional layer receives the outputs of the first feature maps. The second convolutional layer comprises a plurality of second feature maps with the second feature map receiving at least a portion of the outputs of the first feature maps. The second feature map includes second trainable parameters and provides outputs associated with second features. The second feature maps similarly comprise small kernels (e.g., 5 by 5) of trainable parameters (e.g., coefficient or weights) that multiply and sum the inputs and obtain results for various positions. Again, in effect, the convolution can be seen as a trainable filter that extracts a "feature" image from its input image. The feature can be under-sampled, for example, the filter can be evaluated at every other position. This under sampling not only reduces computation, it also decreases the number of free parameter(s) to be learned which results in a smaller memory footprint and better generalization.

The first fully connected layer and the second fully connected layer are fully connected and implement a classifier for the features computed by the first convolutional layer and the second convolutional layer. The first fully connected layer can have trainable parameters. The first fully connected layer and the second fully connected layer comprise a plurality of hidden units. The number of hidden units between the two fully connected layers controls the capacity of the pattern recognition system.

The second fully connected layer provides the output probabilities and can have trainable parameters. The output probability can be a probability associated with a class (e.g., target pattern recognized by the pattern recognition system). The pattern recognition system can be trained utilizing cross entropy error minimization. For example, the pattern recognition system can be trained using stochastic gradient descent minimizing cross entropy error measure to teach the network to output a probability for a class.

Another aspect of the present invention provides for a training system for a pattern recognition system having a pattern recognition system, a cross entropy error calculator, a back propagation gradient descent component and a trainable parameter update component. The pattern recognition system receives a pattern input (e.g., training pattern) and provides a plurality of class probability outputs. The pattern recognition system can utilize a convolutional neural network architecture.

The cross entropy error calculator receives the plurality of class probability outputs from the pattern recognition system and training class information (e.g., target class(es)). The cross entropy error calculator calculates a cross entropy error based, at least in part, upon the plurality of class probability outputs and the training class information (e.g., target class(es)). The cross entropy error calculator can thus calculate a discrepancy between the training class information (e.g., target class(es)) and the plurality of class probability outputs of the pattern recognition system.

The back propagation gradient descent component can utilize a stochastic gradient descent algorithm (e.g., on-line update) to update the training parameters using a noisy, or approximated version of the average gradient. For example, the back propagation gradient descent component can utilize the following equation in updating the training parameters:

$$W_t = W_{t-1} - \varepsilon \frac{\partial E(W)}{\partial W}$$

where W is a set of trainable parameters and $\varepsilon$ is a scalar constant.

The trainable parameter update component updates the training parameters of the pattern recognition system based, at least in part, upon information regarding updated training parameters received from the back propagation gradient descent component.

By utilizing a set of training data having class distortion (e.g., x-translation, y-translation, rotation, scaling, parallel hyperbolic transformation, diagonal hyperbolic transformation and/or thickening), the training system can increase the pattern invariance of the pattern recognition system.

Other aspects of the present invention provide a method for training a pattern recognition system, a computer readable medium having computer executable components for a system facilitating training of a pattern recognition, and a data packet adapted to be transmitted between two or more computer processes comprising a data field comprising a set of trainable parameters for a pattern recognition system based, at least in part, upon a convolutional neural network, the set of trainable parameters updated based, at least in part, upon a gradient descent algorithm utilizing a calculated entropy error.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
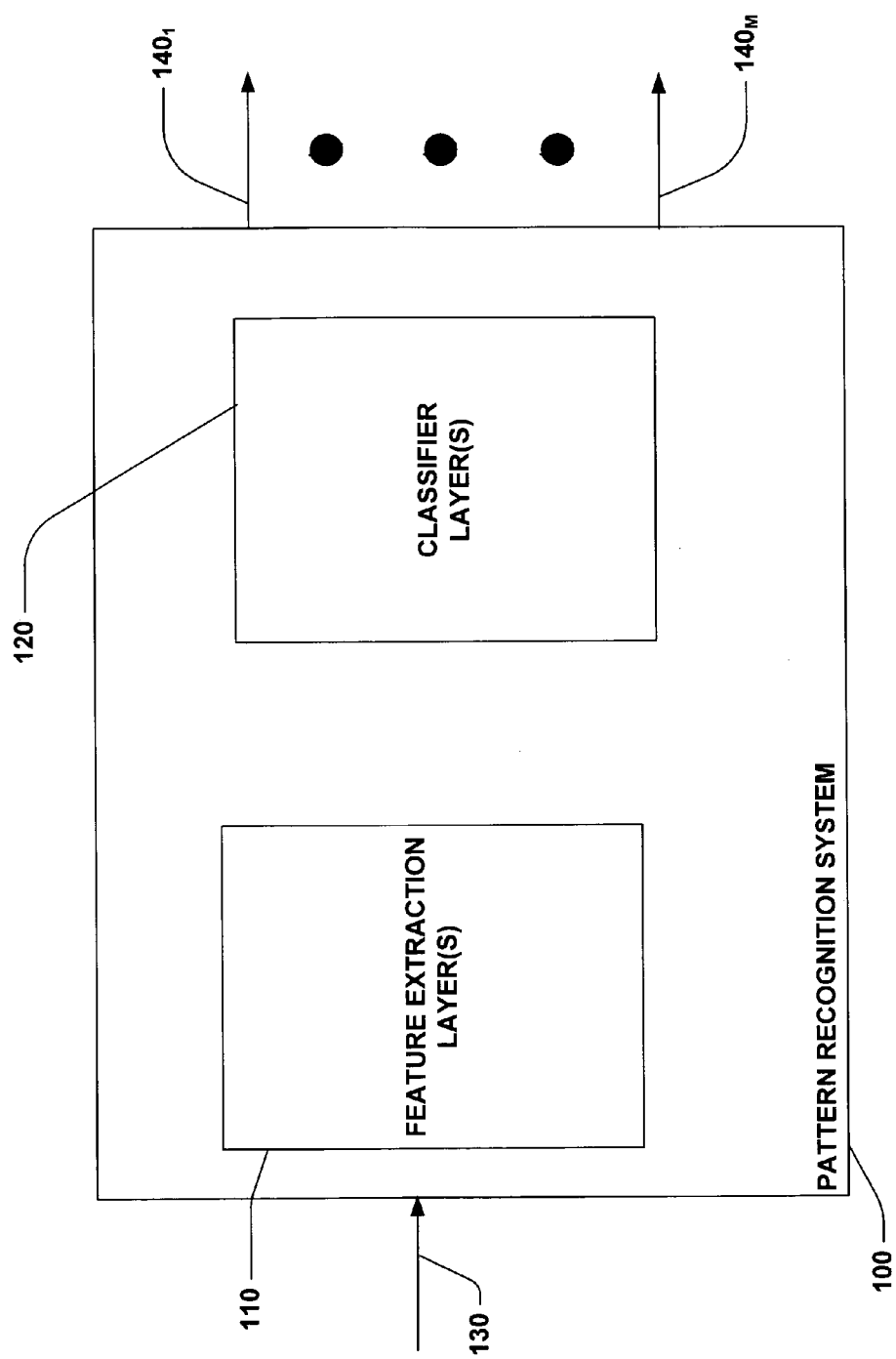
FIG. 1 is a block diagram of a pattern recognition system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Referring to FIG. 1, a pattern recognition system 100 in accordance with an aspect of the present invention is illustrated. The pattern recognition system 100 includes feature extraction layer(s) 110 and classifier layer(s) 120. The pattern recognition system 100 receives a bitmap input pattern 130 (e.g., two-dimensional) and provides a first output probability $140_1$ through an Mth output probability $140_M$, M being an integer greater to or equal to one. The first output probability $140_1$ through the Mth output probability $140_M$ can be referred to collectively as the output probabilities 140. "Bitmap input pattern" refers to an S-dimensional, non-temporal input pattern.

The pattern recognition system 100 can be utilized to perform hand written pattern recognition and/or character recognition. For example, the pattern can come from scanned documents and/or can be a two-dimensional bitmap projection of a pen or a mouse trajectory. The pattern recognition system 100 is based on a convolutional neural network (CNN) architecture, for example, comprising feature extraction layer(s) 110 and classifier layer(s) 120. The pattern recognition system 100 learns from input training data without the need for language specific knowledge, temporal stroke input, pen-directional information and/or stroke order. The pattern recognition system 100 receives the bitmap image input pattern 130 (e.g., down-sampled 29 by 29 pixel image). The pattern recognition system 100 provides output probabilities 140 for bitmap image patterns (classes) (e.g., two-dimensional) evaluated. The output probabilities 140 can be utilized, for example, by language classifier(s), language model(s) and/or segmentation model(s).

The pattern recognition system 100 can be trained utilizing cross entropy error minimization. For example, the pattern recognition system 100 can be trained using stochastic gradient descent minimizing cross entropy error.

The feature extraction layer(s) 110 can comprise convolutional layer(s) of feature maps. "Convolutional layers" are well known in the art and generally refer to components of a neural network in which a group (e.g., feature map) uses substantially the same set of coefficients or weights at different locations, to modify the inputs received; however various groups (e.g., feature maps) use different sets of coefficients. Accordingly, the groups (e.g., feature maps) can extract different feature(s) from the inputs received. The outputs of the feature extraction layer(s) 110 are connected to the classifier layer(s) 120.

The classifier layer(s) 120 can comprise fully connected layer(s) of hidden units. The quantity of hidden units can depend, for example, on the complexity of the task to be learned, the quantity and/or the quality of training examples. Neural networks of this kind are well known in the art; accordingly a full description is omitted for brevity. The classifier layer(s) 120 provides output probabilities 140 (e.g., in the range 0.0 to 1.0).

For example, for a symbol set comprising ten digits (0 through 9), the classifier layer(s) 120 can provide ten output probabilities 140 in the range of 0.0 to 1.0. In one example, it is possible, but not necessarily desirable, to force the sum of the output probabilities 140 to be equal to 1.0. In another example, the sum of the output probabilities 140 is not equal to 1.0—each output unit computes independently the probability of the corresponding class. The advantage of doing so is that in some case, substantially all the probabilities are very small for all classes, which indicates that either the input is not a valid character, or that the confidence is very low. Additionally, forcing the sum to be 1.0 changes the computation of the gradient.

While FIG. 1 is a block diagram illustrating components for the pattern recognition system 100, it is to be appreciated that the feature extraction layer(s) 110 and/or the classifier layer(s) 120 can be implemented as one or more computer components, as that term is defined herein. Thus, it is to be appreciated that computer executable components operable to implement the pattern recognition system 100, the feature extraction layer(s) 110 and/or the classifier layer(s) 120 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 2:
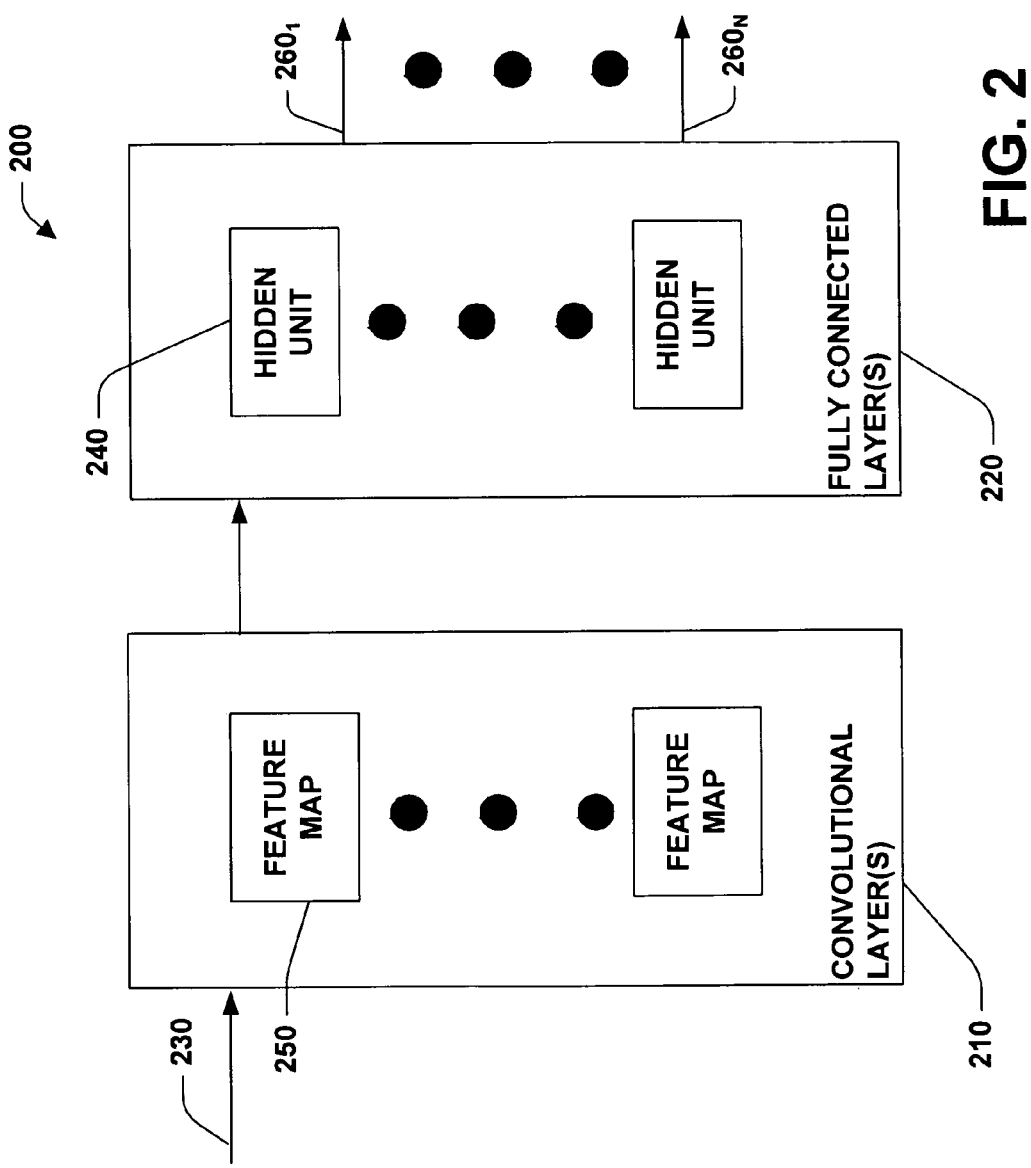
FIG. 2 is a block diagram of a pattern recognition system in accordance with an aspect of the present invention.

Turning next to FIG. 2, a pattern recognition system 200 in accordance with an aspect of the present invention. The pattern recognition system 200 includes convolutional layer(s) 210 and fully connected layer(s) 220. The pattern recognition system 200 receives a bitmap input pattern 230 (e.g., two-dimensional) and provides a first output probability $260_1$ through an Nth output probability $260_N$, N being an integer greater to or equal to one. The first output probability $260_1$ through the Nth output probability $260_N$ can be referred to collectively as the output probabilities 260. The pattern recognition system 200 can be trained utilizing cross entropy error minimization (e.g., using stochastic gradient descent minimizing cross entropy error).

The convolutional layer(s) 210 includes a plurality of feature maps 250. "Convolutional layers" are well known in the art and generally refer to components of a neural network in which the feature map 250 use the same set of trainable parameters (e.g., coefficients or weights) to modify the inputs received; however various feature maps 250 use different sets of trainable parameters (e.g., coefficients or weights). The feature map 250 receives at least a portion of the input pattern. Accordingly, various feature maps 250 can extract different feature(s) from the inputs received. The outputs of the convolutional layer(s) 210 are connected to the fully connected layer(s) 220.

The fully connected layer(s) 220 receives outputs from the convolutional layer(s) 210 and classify the features extracted by the convolutional layer(s) 210. The fully connected layer(s) 220 provide a plurality of output probabilities 260, the output probability comprising a probability associated with a class. The fully connected layer(s) 220 includes a plurality of hidden units 240. The fully connected layer(s) 210 can have its own set of trainable parameters.

In one example, the pattern recognition system 200 is trained utilizing cross entropy error minimization being based, at least in part, upon the following equation:

$$E = -\sum_n \sum_{k=1}^c \{t_k^n \ln(y_k^n) + (1 - t_k^n)\ln(1 - y_k^n)\} \quad (1)$$

Where E is the energy to be minimized, n indexes the pattern, t is the target value, $y_k^n$ is the pattern recognition system output on unit k for pattern n, and k indexes the classes (e.g., for handwritten digits, with 10 classes, c=10). This error equation is sometimes referred to in the art as Kullback-Leibler divergence (or KL distance). In one example, this cross entropy error (E) is multiplied by a first constant. In another example, a second constant is added to E. Further, the pattern recognition system 200 can be trained using stochastic gradient descent.

The pattern recognition system 200 can be trained to recognize a character alphabet or an alphabet subset. For example, if the input originates from a tablet, the pattern recognition system can be utilized for substantially all characters that are generated with one or two strokes of a pen. In the case of Chinese or Japanese characters, this corresponds to a subset of less than 500 classes of the total alphabet.

The convolutional layer(s) 210 and/or fully connected layer(s) 220 can be implemented as one or more computer components, as that term is defined herein.

Figure 3:
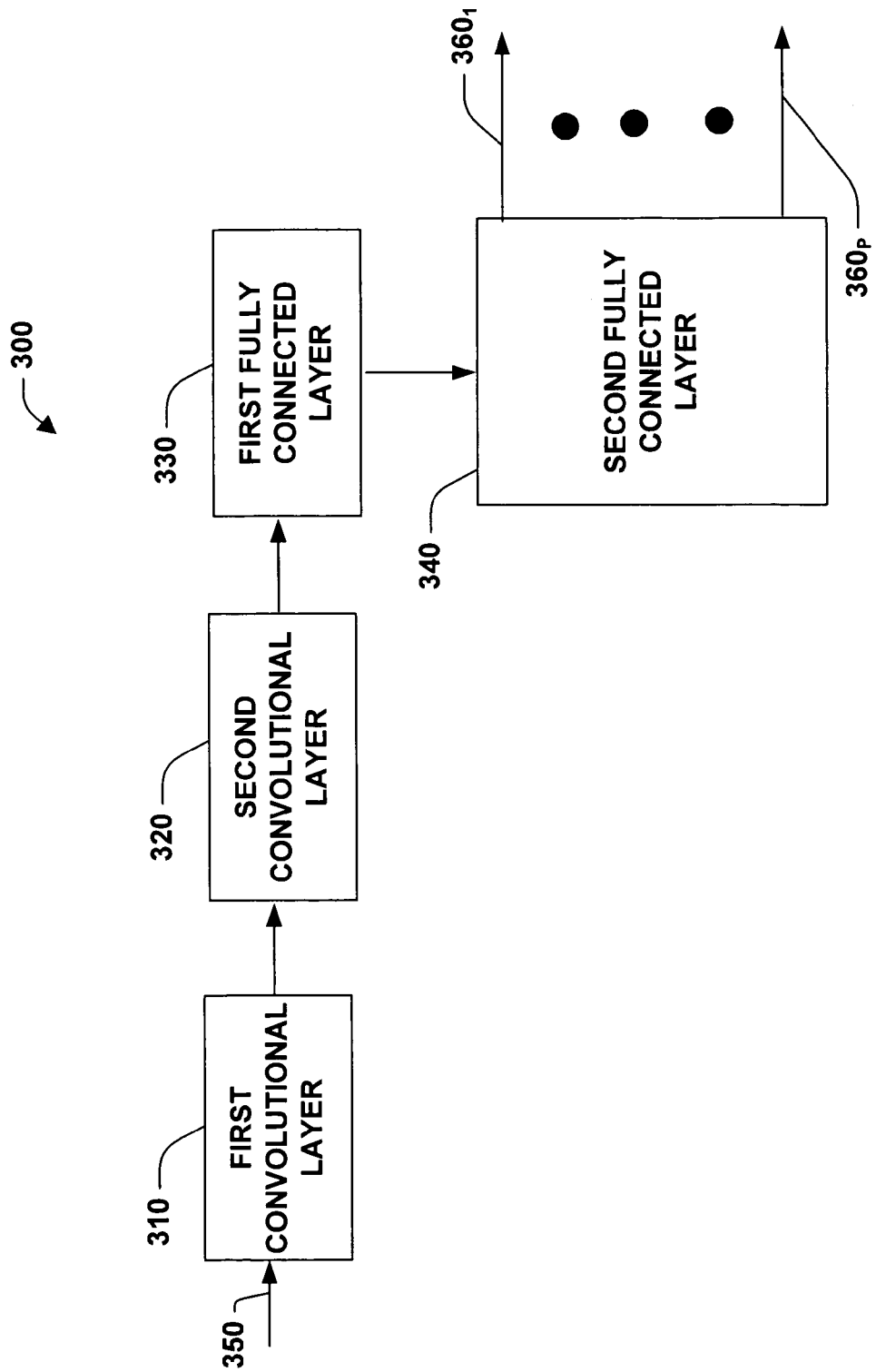
FIG. 3 is a block diagram of a pattern recognition system in accordance with an aspect of the present invention.

Referring next to FIG. 3, a pattern recognition system 300 in accordance with an aspect of the present invention. The pattern recognition system 300 includes a first convolutional layer 310, a second convolutional layer 320, a first fully connected layer 330 and a second fully connected layer 340.

It is to be appreciated that in accordance with the present invention, the pattern recognition system 300 can employ one, two or more convolutional layers and/or one, two or more fully connected layers.

Figure 4:
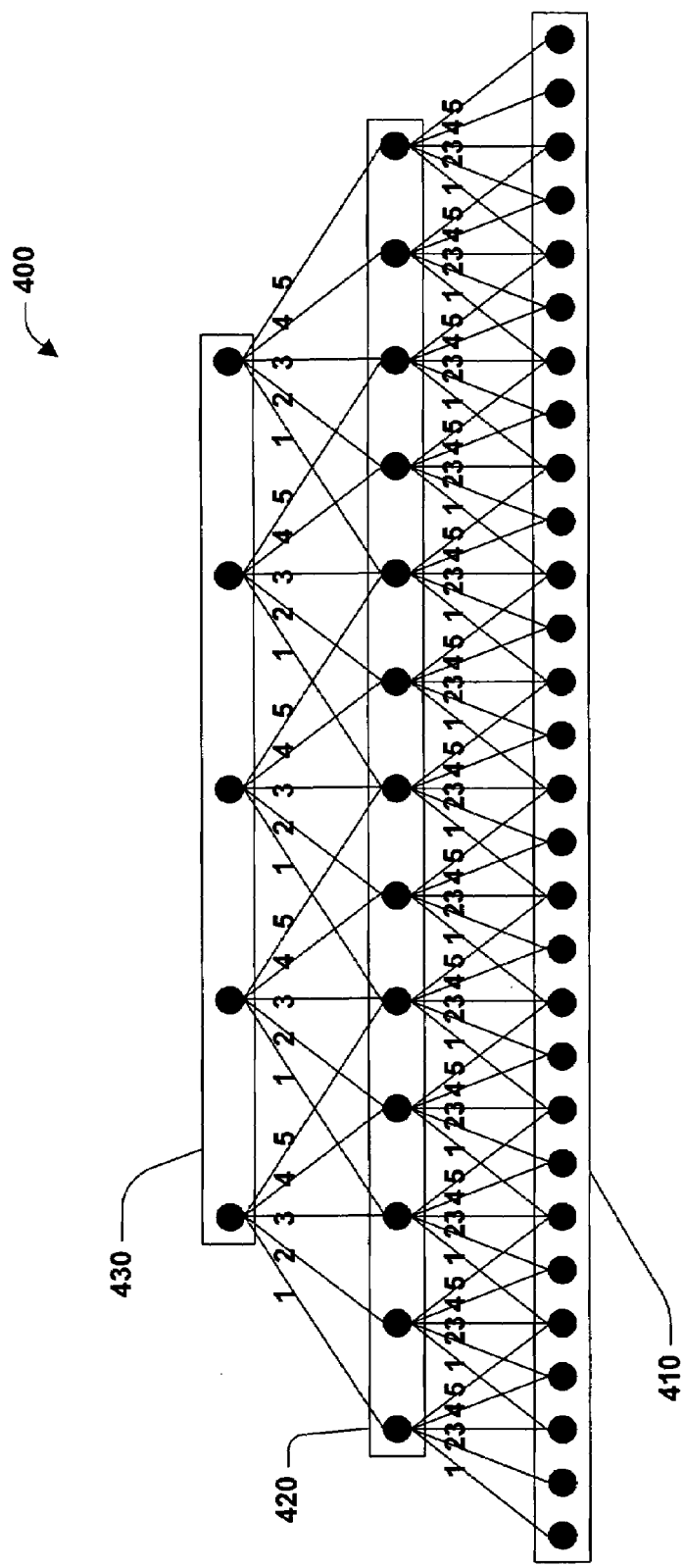
FIG. 4 is a block diagram of an exemplary arrangement of the weight sharing property of convolution and sub sampling in accordance with an aspect of the present invention.

Turning briefly to FIG. 4, an exemplary arrangement 400 of the weight sharing property of convolution and sub sampling in accordance with an aspect of the present invention is illustrated. The arrangement 400 includes inputs 410, one feature map on a first layer 420, and one feature map on a second layer 430. The arrangement 400 further restricts the problem to one dimension for purposes of illustration. Each connection with the same number within a layer can be made to have the same value. Weights are not shared across layers. A sub sampling of 2 is illustrated on the first convolutional layer 420. It can be seen that only half of the position are computed, and that every other unit is not computed. Alternatively, it is also possible to compute the convolution at every position, and follow the convolution by an averaging layer, whose function is to lower the resolution. The purpose of lowering the resolution is to enable the second layer to integrate features over a larger area. Other advantages are a decrease in computation, a decrease of the memory footprint, a shorter learning time, and an improvement in generalization. Sub sampling can be performed in both the X and Y direction. Sub sampling is also responsible for the seemingly arcane number 29, 13 and 4, which results from aligning the boundaries in the pattern recognition system 300 of FIG. 3.

Figure 5:
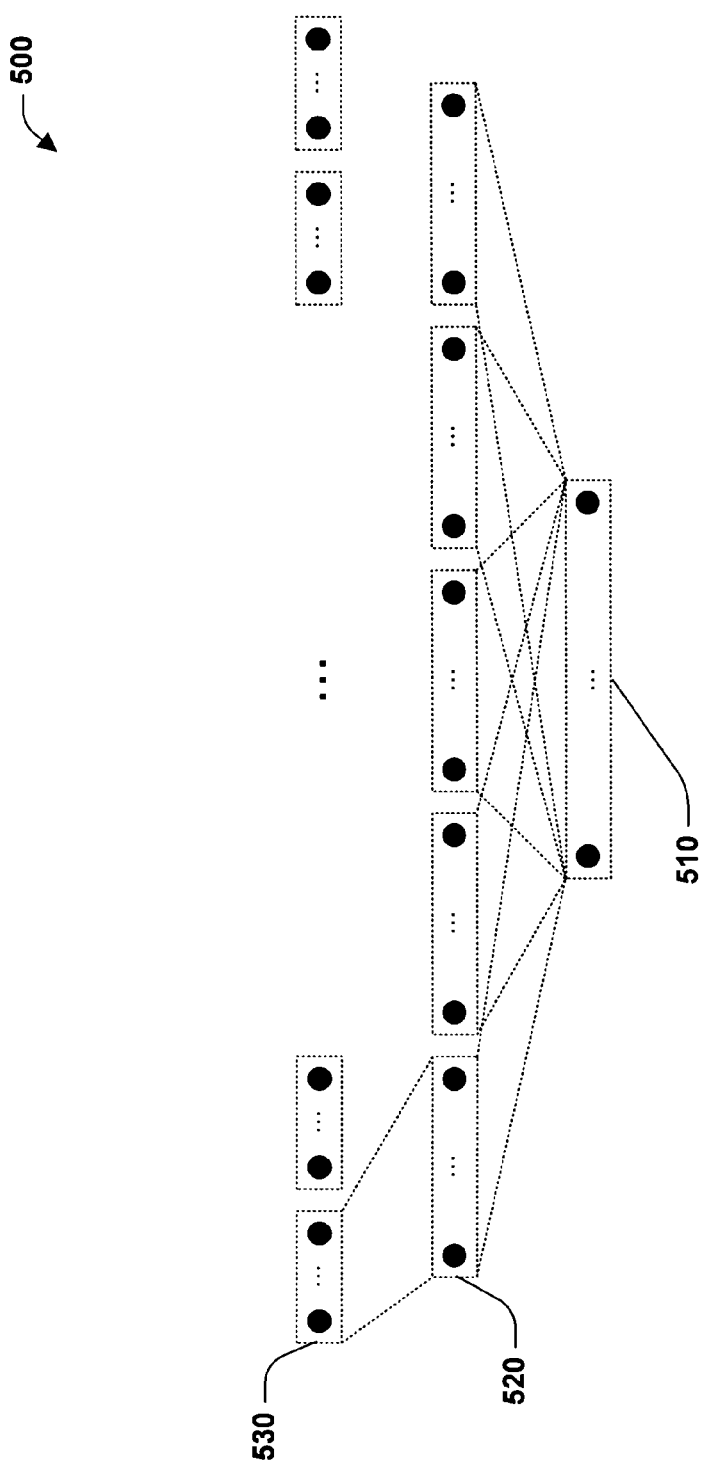
FIG. 5 is a block diagram of an exemplary arrangement of feature maps in accordance with an aspect of the present invention.

Referring next to FIG. 5, an exemplary arrangement 500 of feature maps in accordance with an aspect of the present invention is illustrated. A first convolution layer 520 has 5 features. However, a second layer 530 can have a large number of features, though only two are illustrated for purposes of explanation. Each module of the first layer 520 is connected to each module in the second layer 530, even though only one such connection is depicted, for clarity. There is no weight sharing between such module connection. Each module connection is a convolution of the type depicted in FIG. 4.

Figure 6:
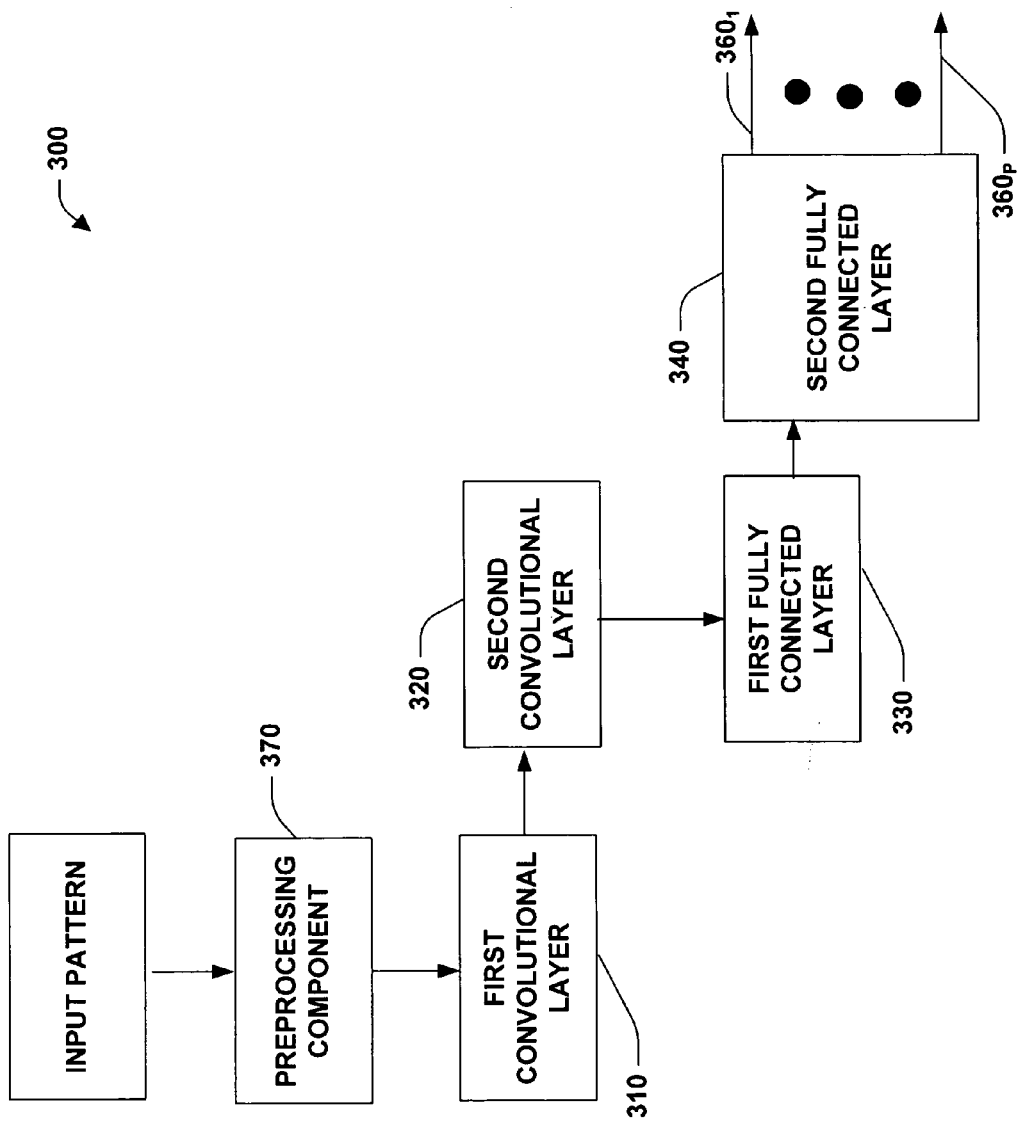
FIG. 6 is a block diagram of a pattern recognition system in accordance with an aspect of the present invention.

As illustrated in FIG. 6, the pattern recognition system 300 can, optionally, include a preprocessing component 370. The preprocessing component 370 does not have to be trainable. For example, the preprocessing component 370 can simply consist of a down sampling function. Alternatively, the preprocessing component 370 can be quite complex, for example, it can transform the input of a pen/mouse into a two-dimensional bitmap suitable for the pattern recognition system 300.

Turning back to FIG. 3, the pattern recognition system 300 can be utilized to perform hand written pattern recognition (e.g., language independent) and/or character recognition from scanned document(s). The pattern recognition system 300 can be trained to recognize a character alphabet or an alphabet subset. For example, if the input originates from a tablet, the pattern recognition system can be utilized for substantially all characters that are generated with one or two strokes of a pen. In the case of Chinese or Japanese characters, this corresponds to a subset of less than 500 classes of the total alphabet.

The pattern recognition system 300 is based on a CNN architecture and learns from input training data without the need for language specific knowledge, temporal stroke input, pen-directional information and/or stroke order. The pattern recognition system 300 receives a bitmap image input pattern 350 (e.g., two-dimensional, non-temporal). In one example, the bitmap image input pattern 350 comprises a 29 by 29 bit pixel image down-sampled from a 232 by 232 input pattern, for example, by the optional preprocessing component 370. The bitmap image input pattern 350 can be based on a down-sampled tablet input (e.g., pen and/or stylus trajectory) projected onto a two dimensional binary image (e.g., 128 by 128). The image can be obtained by using the Microsoft GDI+ graphic library subroutine which set the binary pixels from location (X1,Y1) to (X2,Y2) as a line of a given thickness. When the image is down sampled, it becomes a gray level image.

The pattern recognition system 300 provides a first output probability $360_1$ through a Pth output probability $360_P$, P being an integer greater to or equal to one. The first output probability $360_1$ through the Pth output probability $360_P$ can be referred to collectively as the output probabilities 360. The output probabilities 360 can be a probability associated with a class (e.g., target pattern recognized by the pattern recognition system 300). The output probabilities 360 can be utilized, for example, by language classifier(s), language model(s) and/or segmentation model(s).

The first convolutional layer 310 and the second convolutional layer 320 extract features of the bitmap image input pattern 350. The first fully connected layer 330 and the second fully connected layer 340 work as a classifier.

The first convolutional layer 310 comprises a plurality of first feature maps that receive at least a portion of the input pattern. The first feature map includes first trainable parameters and provides outputs associated with first features. The first feature maps comprise small kernels (e.g., 5 by 5) of trainable parameters (e.g., coefficient or weights) that multiply and sum the inputs and obtain results for various positions. In effect, the convolution can be seen as a trainable filter that extracts a "feature" image from its input image. The first trainable parameters for a first feature map can be substantially equal for different spatial locations in the input image (e.g., as the whole feature map is translated for each location).

In one example, the first convolutional layer 310 computes five convolutions of the input skipping every other location. This sub-sampling reduces the spatial resolution and therefore not only decreases computation, but also forces the network to learn some spatial invariance. The features extracted by the first convolutional layer 310 are mostly edges and line intersection detectors and have half the resolution in both the X and Y direction, as the input (e.g., see the description regarding FIGS. 4 and 5). In another example, the first convolutional layer 310 comprises five first feature maps (e.g., the first feature map receiving 156 inputs).

The second convolutional layer 320 receives the outputs of the first feature maps. The second convolutional layer 320 comprises a plurality of second feature maps with the second feature map receiving at least a portion of the outputs of the first feature maps. The second feature map includes second trainable parameters and provides outputs associated with second features. The second feature maps similarly comprise small kernels (*e.g.*, 5 by 5) of trainable parameters (e.g., coefficient or weights) that multiply and sum the inputs and obtain results for various positions. Again, in effect, the convolution can be seen as a trainable filter that extracts a "feature" image from its input image.

In one example, the second convolutional layer 320 is similar to the first convolutional layer 310, except that fifty features are extracted from the result of the first layer convolutional layer 310. Again sub-sampling forces the network to learn position invariance and reduces computation. For example, the second convolutional layer 320 can extract such features as curvature, loops, stroke ends, and/or stroke intersections. In another example, the second convolutional layer 320 comprises fifty second feature maps (e.g., the second feature map receiving 25 inputs).

The first fully connected layer 330 and the second fully connected layer 340 are fully connected and implement a classifier for the features computed by the first convolutional layer 310 and the second convolutional layer 320. The first fully connected layer 330 can have trainable parameters.

The first fully connected layer 330 and the second fully connected layer 340 comprise a plurality of hidden units. The number of hidden units between the two fully connected layers controls the capacity of the pattern recognition system 300.

In one example, the pattern recognition system 300 is employed to recognize English digits (0 through 9) and the first fully connected layer 330 includes about 100 hidden units. In another example, the pattern recognition system 300 is employed to recognize one and two stroke Japanese characters and the first fully connected layer 330 includes about 200 hidden units.

The second fully connected layer provides the output probabilities 360. The output probabilities 360 can be a probability associated with a class (e.g., target pattern recognized by the pattern recognition system 300). The second fully connected layer 340 can have trainable parameters.

In one example, the pattern recognition system 300 is employed to recognize English digits and the second fully connected layer 340 provides ten output probabilities 360. In another example, the pattern recognition system 300 is employed to recognize one and two stroke Japanese characters and the second fully connected layer 340 provides about 250 output probabilities 360.

The pattern recognition system 300 can be trained utilizing cross entropy error minimization. The cross entropy error minimization can be based, at least in part, upon the equation (1) set forth above (e.g., Kullback-Leibler divergence). In one example, the cross entropy error (E) is multiplied by a first constant. In another example, a second constant is added to E.

For example, the pattern recognition system 300 can be trained using stochastic gradient descent minimizing cross entropy error measure to teach the network to output a probability for a class.

In one example, a pattern recognition system 300 having a first convolutional layer 310 computes five convolutions of a two-dimensional bitmap image input pattern 350 skipping every other location (e.g., see the description regarding FIGS. 4 and 5). Thus, the first convolutional layer 310 extracts five 13 by 13 features. The second convolutional layer 320 similarly extracts fifty 5 by 5 features from the result of the first convolutional layer 310. The first fully connected layer 330 and the second fully connected layer 340 comprise 100 hidden units and implement a classifier for the features computed by the first convolutional layer 310 and the second convolutional layer 320.

The pattern recognition system 300 of this example was trained using stochastic gradient descent minimizing cross entropy error measure to teach the network to output probabilities for the class of handwritten digits (0-9). The pattern recognition system 300 of this example was benchmarked utilized the MNIST standard handwritten digit database. The MNIST database is composed of 60,000 handwritten digits for training, and 10,000 handwritten digits for testing. The results of the pattern recognition system 300 of this example compared against existing systems, in percentage of errors, are listed below:

| | |
|---|---|
| Linear classifier: | 12.0% |
| K-nearest neighbor: | 5.0% |
| 2 layer (300 HU): | 4.7% |
| 2 layer (1000 HU): | 4.5% |
| 2 layer + distortions (300 HU): | 3.6% |
| 2 layer + cross entropy (800 HU): | 1.5% |
| Tangent distance: | 1.1% |
| Simple convolutional (lenet4): | 1.1% |
| Large convolutional + distortions: | 0.85% |
| SVM: | 0.80% |
| Boosting (with distortion): | 0.70% |
| Pattern Recognition System in accordance with an aspect of the present invention | 0.65% |

Thus, the pattern recognition system 300 of this example achieved the best performance on this standard database.

Additionally, the pattern recognition system 300 does not rely on tablet temporal information and/or stroke order. Input keystrokes are projected onto a bitmap, which is then fed to pattern recognition system 300 as a two-dimensional image bitmap image input pattern 350. Further, the pattern recognition system 300 is based on learning data and is therefore not reliant on language specific knowledge handcrafted as in many conventional systems. The pattern recognition system 300 can be trained to recognize one stroke Asian characters, two stroke Asian characters, one stroke Japanese characters, two stroke Japanese characters and/or a plurality of ASCII characters.

Figure 7:
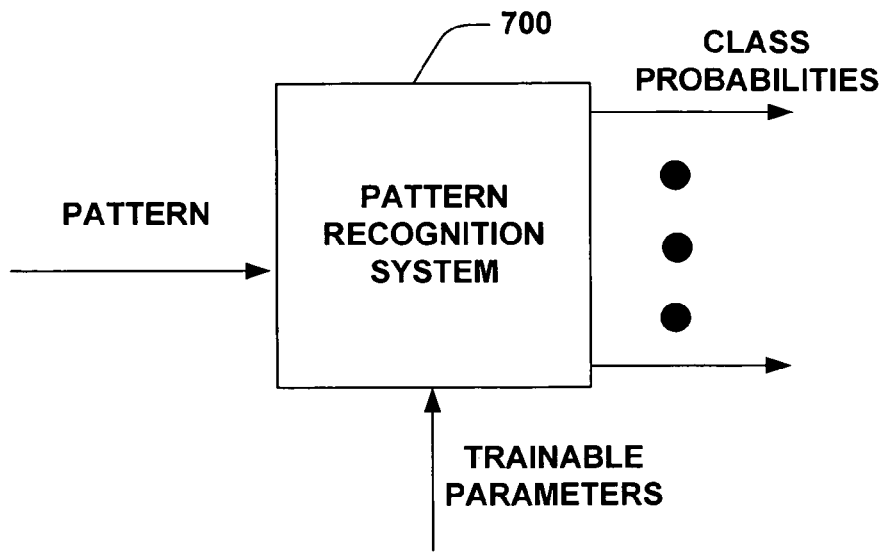
FIG. 7 is a block diagram of a pattern recognition system employing trainable parameters in accordance with an aspect of the present invention.

Turning briefly to FIG. 7, a pattern recognition system 700 employing trainable parameters in accordance with an aspect of the present invention is illustrated. The pattern recognition system 700 receives an input pattern and provides class probabilities as outputs based, at least in part, upon the pattern and the trainable parameters.

Figure 8:
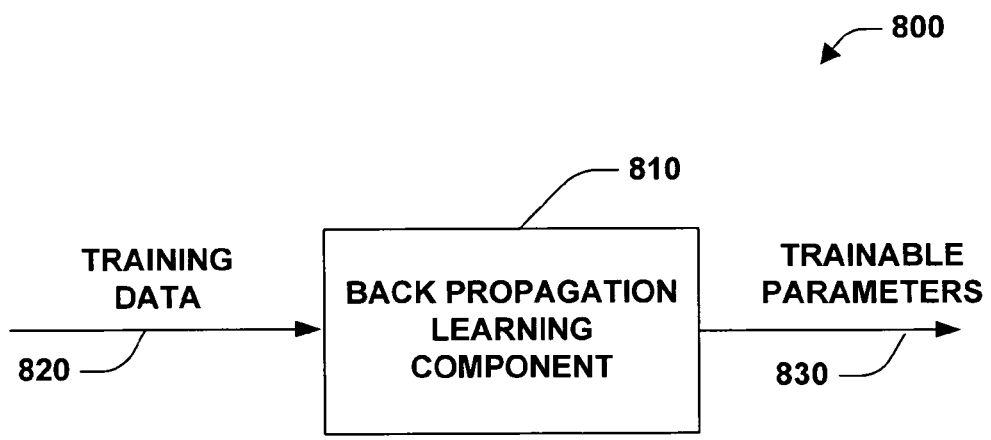
FIG. 8 is a block diagram of a back propagation learning system in accordance with an aspect of the present invention.

Next, referring to FIG. 8, a back propagation learning system 800 in accordance with an aspect of the present invention is illustrated. The back propagation learning system 800 includes a back propagation learning component 810 that receives training data 820 (e.g., based on cross entropy error between class probabilities and training class information) and provides modified trainable parameters 830 (e.g., to a pattern recognition system).

Figure 9:
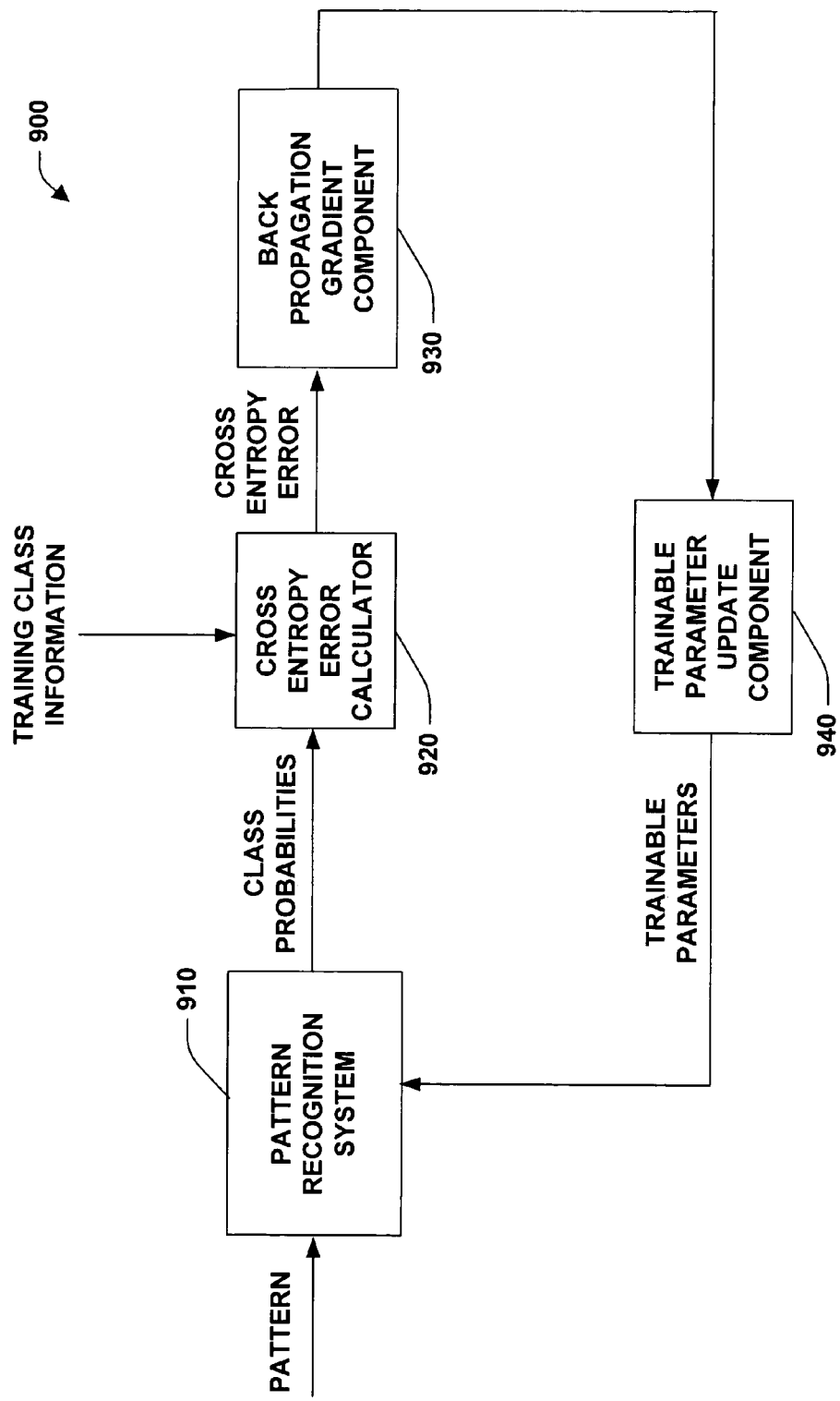
FIG. 9 is a block diagram of a training system for pattern recognition system in accordance with an aspect of the present invention.

Referring next to FIG. 9, a training system 900 for a pattern recognition system in accordance with an aspect of the present invention is illustrated. The training system 900 includes a pattern recognition system 910, a cross entropy error calculator 920, a back propagation gradient descent component 930 and a trainable parameter update component 940.

The pattern recognition system 910 receives a pattern input (e.g., training pattern) and provides a plurality of class probability outputs. The pattern recognition system 910 can utilize a CNN architecture as set forth previously.

The cross entropy error calculator 920 receives the plurality of class probability outputs from the pattern recognition system 910 and training class information (e.g., target class). The cross entropy error calculator 920 calculates a cross entropy error based, at least in part, upon the plurality of class probability outputs and the training class information (e.g., target classes). For example, the cross entropy error calculator 920 can utilize equation (1) set for above in calculating cross entropy error (Kullback-Leibler divergence). In one example, the calculated cross entropy error is multiplied by a first constant. In another example, a second constant is added to the calculated cross entropy error. The cross entropy error calculator 920 can thus calculate a discrepancy between the training class information (e.g., target classes) and the plurality of class probability outputs of the pattern recognition system 910.

The back propagation gradient descent component 930 can utilize a stochastic gradient descent algorithm (e.g., on-line update) to update the training parameters using a noisy, or approximated version of the average gradient. For example, the back propagation gradient descent component 930 can utilize the following equation in updating the training parameters:

$$W_t = W_{t-1} - \varepsilon \frac{\partial E(W)}{\partial W} \quad (2)$$

where W is a set of trainable parameters and $\varepsilon$ is a scalar constant.

The trainable parameter update component 940 updates the training parameters of the pattern recognition system 910 based, at least in part, upon information regarding updated training parameters received from the back propagation gradient descent component 930.

By utilizing a set of training data having class distortion (e.g., x-translation, y-translation, rotation, scaling, parallel hyperbolic transformation, diagonal hyperbolic transformation and/or thickening), the training system 900 can increase the pattern invariance of the pattern recognition system 910.

The pattern recognition system 910, the cross entropy error calculator 920, the back propagation gradient descent component 930 and/or the trainable parameter update component 940 can be implemented as one or more computer components, as that term is defined herein.

Figure 10:
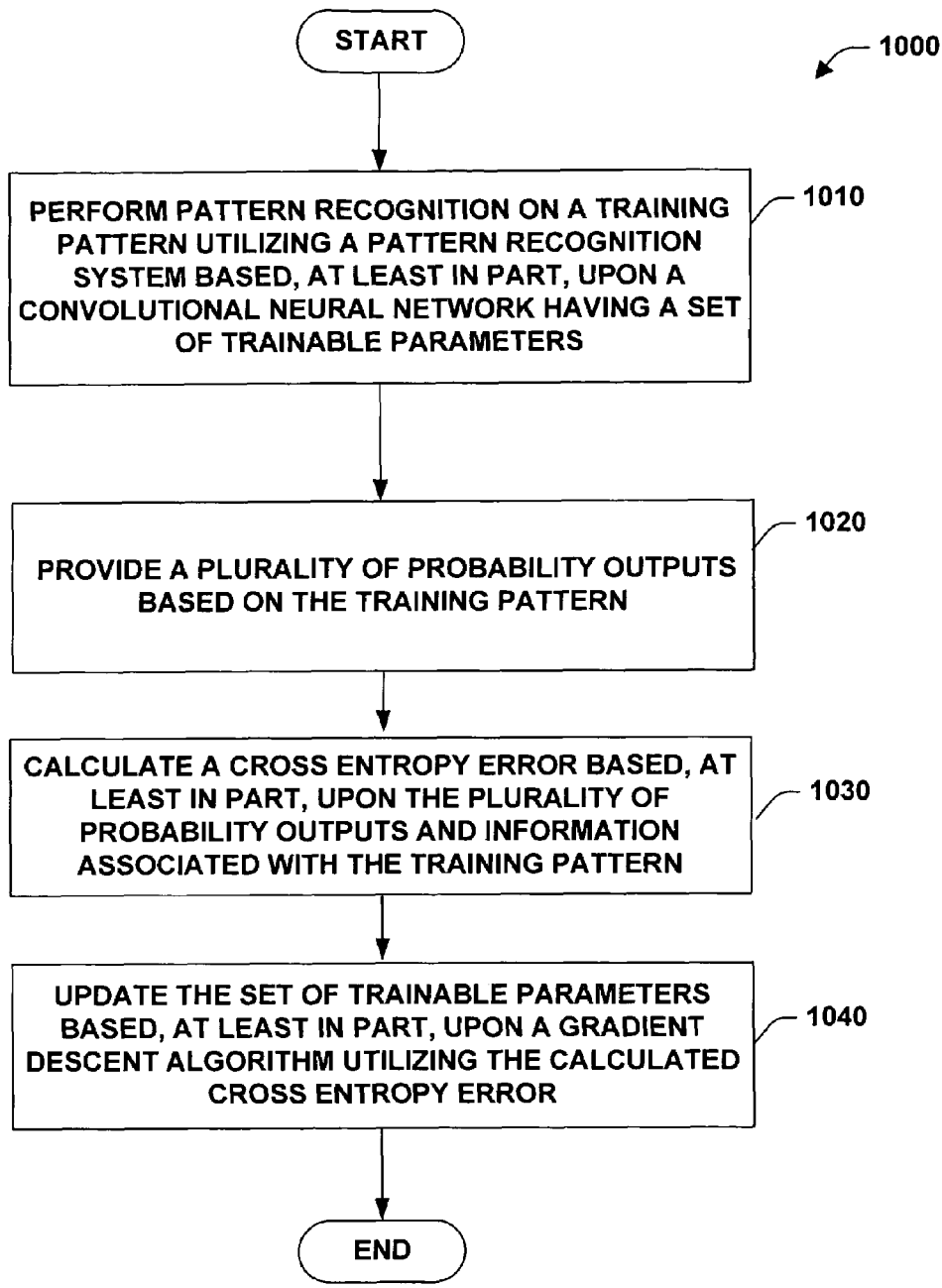
FIG. 10 is a flow chart illustrating a method for training a pattern recognition system in accordance with an aspect of the present invention.

In view of the exemplary systems shown and described above, a methodology that may be implemented in accordance with the present invention will be better appreciated with reference to the flow chart of FIG. 10. While, for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Turning to FIG. 10, a method 1000 for training a pattern recognition system in accordance with an aspect of the present invention is illustrated. At 1010, pattern recognition is performed on a training pattern utilizing a pattern recognition system based, at least in part, upon a convolutional neural network having a set of trainable parameters. At 1020, a plurality of output probabilities is provided based on a training pattern. At 1030, a cross entropy error of the output probabilities generated by pattern recognition and information associated with the training pattern is calculated. At 1040, the set of trainable parameters utilized for pattern recognition are updated based, at least in part, upon a gradient descent algorithm utilizing the calculated cross entropy error.

It is to be appreciated that the system and/or method of the present invention can be utilized in a pattern recognition system. Further, those skilled in the art will recognize that the system and/or method of the present invention can be employed in a vast array of pattern recognition applications, including, but not limited to, handwriting recognition systems, document scanners, optional character recognition systems, personal digital assistants (PDAs) and/or tablet personal component systems.

Figure 11:
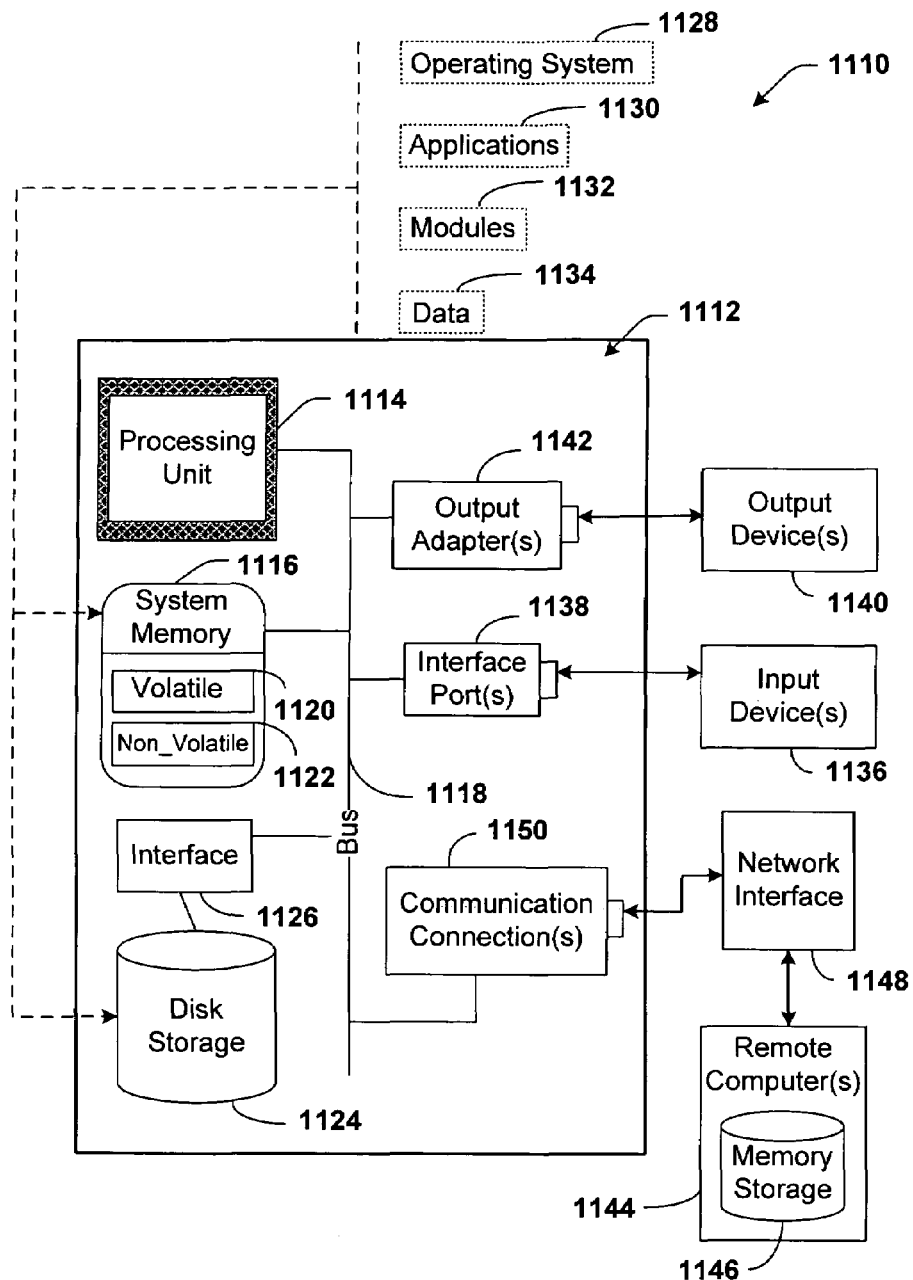
FIG. 11 illustrates an example operating environment in which the present invention may function.

In order to provide additional context for various aspects of the present invention, FIG. 11 and the following discussion are intended to provide a brief, general description of a suitable operating environment 1110 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1110 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/nonremovable, volatile/nonvolatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A pattern recognition system, comprising:
   a preprocessing component that receives an input and provides an output pattern;
   at least one convolutional layer that receives the output pattern from the preprocessing component, the convolutional layer comprising a plurality of feature maps, the feature map including trainable parameters, the at least one convolutional layer providing outputs associated with features extracted from the output pattern; and,
   at least one fully connected layer that receives outputs from the at least one convolutional layer, the at least one fully connected layer classifying the features extracted by the at least one convolutional layer, the at least one fully connected layer providing a plurality of outputs, the output comprising a probability associated with a class, the pattern recognition system trained utilizing cross entropy error minimization based at least in part, upon the equation $$E = -\sum_n \sum_{k=1}^c \{t_k^n \ln(y_k^n) + (1 - t_k^n)\ln(1 - y_k^n)\}$$

where E is the energy to be minimized, n indexes a pattern, t is the target value, $y_k^n$ is the pattern recognition output on unit k for pattern n, and k indexes the classes.

2. The pattern recognition system of claim 1, the trainable parameters for the feature map being equal.

3. The pattern recognition system of claim 1 trained using a stochastic gradient descent algorithm.

4. The pattern recognition system of claim 1 trained to recognize one stroke Asian characters.

5. The pattern recognition system of claim 1 trained to recognize two stroke Asian characters.

6. The pattern recognition system of claim 1 trained to recognize one stroke Japanese characters.

7. The pattern recognition system of claim 1 trained to recognize two stroke Japanese characters.

8. The pattern recognition system of claim 1 trained to a plurality of ASCII characters.

9. A pattern recognition system, comprising:
   a preprocessing component that receives an input and provides a bitmap output pattern;
   a first convolutional layer that receives the bitmap output pattern from the preprocessing component, the first convolutional layer comprising a plurality of first feature maps, the first feature map including a first set of trainable parameters, the first feature maps providing outputs associated with first features extracted from the bitmap output pattern;
   a second convolutional layer that receives the outputs of the first feature maps, the second convolutional layer comprising a plurality of second feature maps, the second feature map receiving at least a portion of the outputs of the first feature maps, the second feature map including a second weighted set of trainable parameters, the second feature maps providing outputs associated with second features;
   a first fully connected layer that classifies the outputs of the second feature maps, the first fully connected layer providing outputs; and
   a second fully connected layer that classifies the outputs of the first fully connected layer, the second fully connected layer providing a plurality of outputs, the output comprising a probability associated with a class, the pattern recognition system trained utilizing cross entropy error minimization based at least in part, upon the equation $$E = -\sum_n \sum_{k=1}^c \{t_k^n \ln(y_k^n) + (1 - t_k^n)\ln(1 - y_k^n)\}$$

where E is the energy to be minimized, n indexes a pattern, t is the target value, $y_k^n$ is the pattern recognition output on unit k for pattern n, and k indexes the classes.

10. The pattern recognition system of claim 9, the first convolutional layer comprising five first feature maps.

11. The pattern recognition system of claim 10, the first feature map receiving 156 inputs.

12. The pattern recognition system of claim 10, the second convolutional layer comprising fifty second feature maps.

13. The pattern recognition system of claim 10, the second feature map receiving 25 inputs.

14. The pattern recognition system of claim 10, the first fully connected layer comprising one hundred hidden units.

15. The pattern recognition system of claim 10, the first trainable parameters for a first feature map being equal.

16. The pattern recognition system of claim 10 trained using stochastic gradient descent algorithm.

17. The pattern recognition system of claim 10 trained to recognize one stroke Asian characters.

18. The pattern recognition system of claim 10 trained to recognize two stroke Asian characters.

19. The pattern recognition system of claim 10 trained to recognize one stroke Japanese characters.

20. A method for training a pattern recognition system, comprising:
preprocessing a training pattern utilizing a preprocessing component;
performing pattern recognition on an output pattern from the preprocessing component utilizing a pattern recognition system based, at least in part, upon a convolutional neural network having a set of trainable parameters;
providing a plurality of class probability outputs based on the training pattern;
calculating a cross entropy error based, at least in part, upon the plurality of class probability outputs and information associated with the training pattern utilizing the equation $$E = -\sum_n \sum_{k=1}^{c} \{t_k^n \ln(y_k^n) + (1 - t_k^n)\ln(1 - y_k^n)\}$$

where E is the energy to be minimized, n indexes a pattern, t is the target value, $y_k^n$ is the pattern recognition output on unit k for pattern n, and k indexes the classes; and,
updating the set of trainable parameters based, at least in part, upon a gradient descent algorithm utilizing the calculated cross entropy error.

* * * * *